United States Patent [19]
Richard

[11] 3,972,118
[45] Aug. 3, 1976

[54] CULINARY ARTICLES AND APPARATUS FOR RETRIEVING AND/OR SORTING THE SAME

[76] Inventor: Wilton Richard, Rte. 1, Box 359-1/2, Shreveport, La. 71105

[22] Filed: Apr. 14, 1975

[21] Appl. No.: 567,740

Related U.S. Application Data

[62] Division of Ser. No. 410,481, Oct. 29, 1973, Pat. No. 3,877,577.

[52] U.S. Cl. .................. 30/296 A; 30/327
[51] Int. Cl.² .................. A47J 43/28
[58] Field of Search .................. 30/296 A, 327, 142; 248/206 A; 209/73, 97, 74 R

[56] References Cited

UNITED STATES PATENTS

| | | | |
|---|---|---|---|
| 2,112,649 | 3/1938 | Dreyfuss | 30/296 A |
| 2,217,514 | 10/1940 | Henry | 248/206 A |
| 2,457,032 | 12/1948 | Case | 248/206 A |
| 2,907,085 | 10/1959 | Bosland | 248/206 A |
| 3,204,601 | 9/1965 | Staver | 248/206 A |
| 3,508,183 | 4/1970 | Pinckard | 248/206 A |

FOREIGN PATENTS OR APPLICATIONS

| | | | |
|---|---|---|---|
| 366,682 | 2/1932 | United Kingdom | 248/206 A |

*Primary Examiner*—Al Lawrence Smith
*Assistant Examiner*—J. C. Peters
*Attorney, Agent, or Firm*—John F. Sieberth

[57] ABSTRACT

Disclosed are (i) items such as knives, forks, spoons and dishes having magnetically responsive end portions enabling the items to be retrieved and/or sorted by type by automatic apparatus, and (ii) apparatus which automatically performs such operations.

10 Claims, 12 Drawing Figures

CULINARY ARTICLES AND APPARATUS FOR RETRIEVING AND/OR SORTING THE SAME

REFERENCE TO RELATED APPLICATION

This application is a division of my prior copending application Ser. No. 410,481, filed Oct. 29, 1973 now U.S. Pat. No. 3,877,577.

BACKGROUND OF THE INVENTION

Various methods and apparatus for cleaning and sorting culinary items have been proposed heretofore. See for example U.S. Pat. Nos. 3,247,858; 3,483,877; and 3,486,939. As pointed out in U.S. Pat No. 3,486,939 most of these prior proposals have had limitations in operational capacity because of the inherent handling time involved in mechanically sensing and sizing the configuration of the object to be sorted or classified. Also, despite the use of various types of automated equipment these prior systems have required the presence of attendants to carry out manual sorting operations or the like.

The apparatus described in U.S. Pat. No. 3,486,939, which is designed to overcome prior limitations on operational capacity and reduce the number of attendants required in the operation, involves separating magnetically responsive chinaware from magnetically responsive silverware by passing the silverware through a grid which retains the chinaware, and then passing the separated items through a number of stations whereby the various articles are classified and isolated from each other. The silverware, for example, is passed through several magnetic stations of different field strengths, the effectiveness of the separations being dependent upon one type of silverware (e.g., spoons) being selectively removed from other magnetically responsive silverware by virtue of the strength of the particular magnetic field through which they pass. Thus, for the silverware alone the use of three different magnetic stations of different field strengths is described. In addition, the system involves several operations in which operating personnel participate.

U.S. Pat. No. 3,508,183 describes magnetically responsive silverware and chinaware for use with the apparatus of U.S. Pat. No. 3,486,939. Such articles contain a preselected quantity of magnetically attractive particles discriminately positioned within article-shaped non-magnetic material so that the article can be attracted and moved in response to the controlled magnetic field. Articles having a greater quantity of magnetically attracted particles are responsive to weak magnetic fields while those containing less particles are attracted only by the strongest fields.

SUMMARY OF THE INVENTION

In accordance with this invention culinary items are provided which can readily be retrieved or sorted, or both, by apparatus of this invention which performs these operations automatically and in an efficient and economical manner. In essence, the culinary items of this invention, such as knives, forks, spoons, dishes and the like, are characterized by having magnetically responsive end portions differing in cross-sectional sizes according to the article, like articles having end portions of like cross-sectional size, the balance of the articles being essentially non-magnetically responsive. Although it is possible to employ magnetically responsive end portions or protuberances of different geometric configurations, the end portions should be symmetrical and free from sharp corners. In other words, end portions with curved or rounded surfaces are preferred, such as for example cylindrical end portions terminating in a hemisphere or dome. Culinary items in which the magnetically responsive end portions are generally spherical in shape (i.e., spherical except for the locus of attachment to the body of the article) are the most preferred for the practice of this invention. In the case of table silverware the magnetically responsive end portion is preferably positioned at the end of the handle. In the case of dishes it is preferable to position the end portion or protuberance on the rims of plates and on the handles of cups.

Another embodiment of this invention involves apparatus for collecting and transporting culinary items having magnetically responsive end portions which comprises a plurality of spaced apart magnetic means for magnetically engaging and individually carrying said articles by means of their respective end portions; means for moving each said magnetic means along a selected path of travel; and means for disengaging each said article from said magnetic means at a selected location. Such apparatus is particularly useful for intercepting or retrieving such culinary items from conveyor systems and for transporting the items to a different location. In this apparatus the respective magnetic means are preferably moved in repetitive cyclical paths of travel as this facilitates and improves the efficiency of such retrieval operations. For achieving the maximum coverage of a conveyor system in a retrieval operation, the apparatus is most preferably designed so that not only is each magnetic means moved in a repetitive cyclical path in a vertical plane, but the magnetic means are spaced from each other so that there is movement in a plurality of laterally spaced vertical planes.

Still another embodiment of this invention is apparatus for collecting and classifying articles of silverware having magnetically responsive end portions differing in cross-sectional size according to the article, like articles having end portions of like cross-sectional size, which comprises magnetic means for magnetically engaging said articles by means of said end portions, means for moving said magnetic means and engaged articles along a predetermined path of travel, means along said predetermined path of travel for disengaging said magnetic means and engaged articles at one of a plurality of different locations, the location at which disengagement occurs being dependent upon the cross-sectional size of the end portion of the article being disengaged, and means associated with each location for collecting the articles disengaged at said location.

The above and other embodiments, aspects, features, advantages, objects and characteristics of this invention will become still further apparent from the ensuing description, appended claims and accompanying drawings wherein like characters of reference designate like parts.

Figure 7:
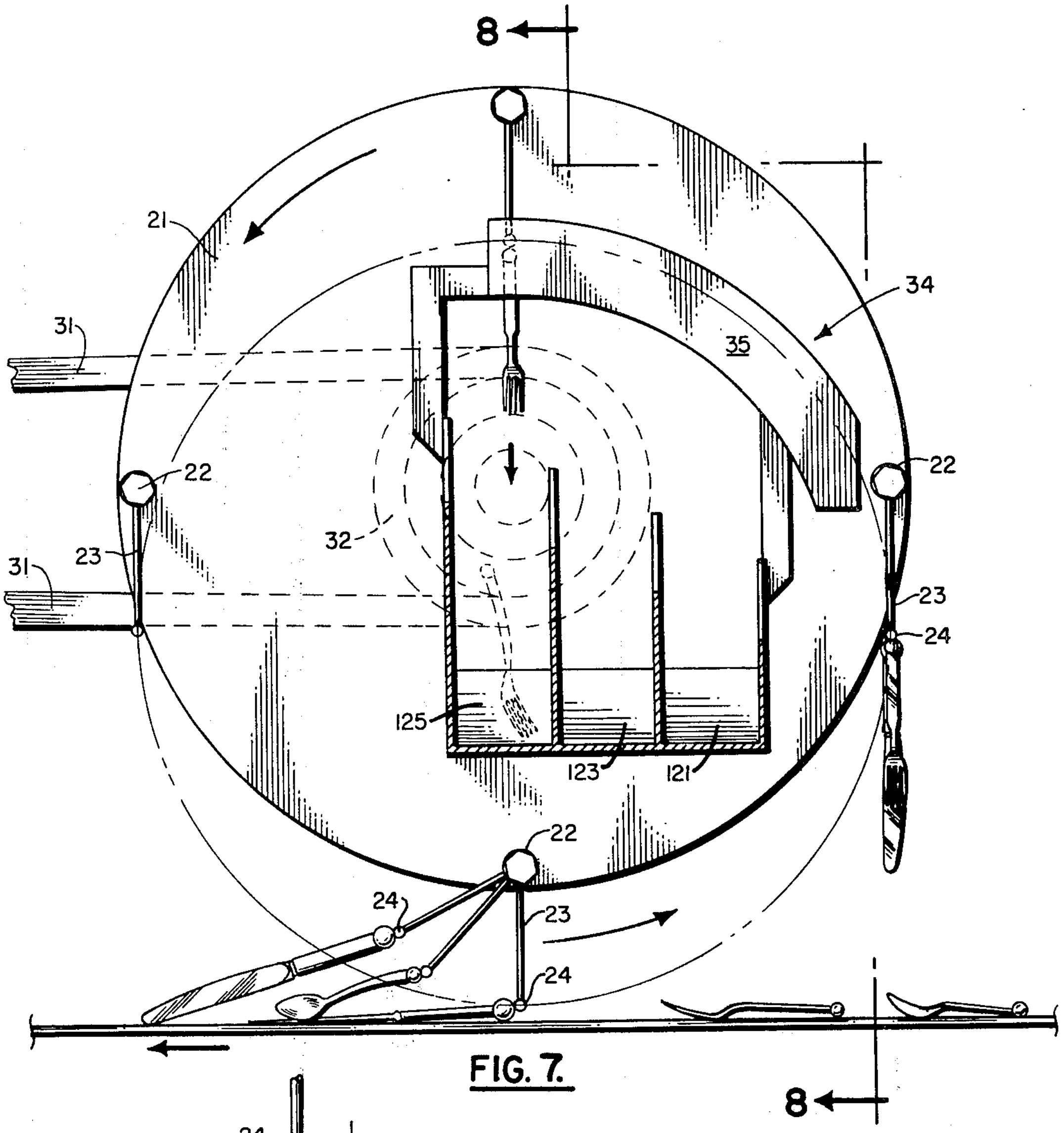
FIG. 7 is a side view of a preferred apparatus for automaticallly gathering silverware from a conveyor, classifying the silverware according to like articles, and isolating the classified articles each from the other.
Figure 8:
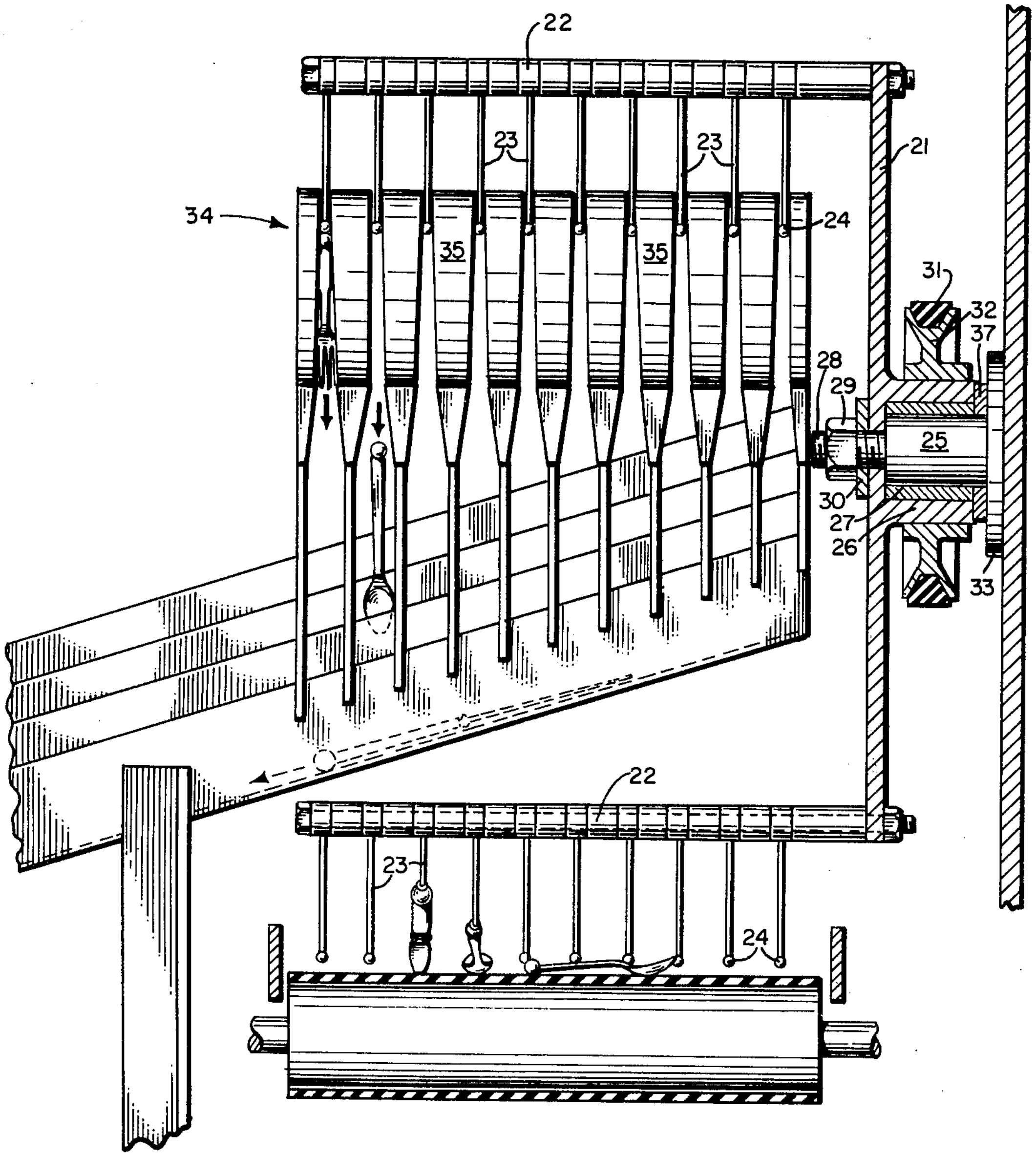
FIG. 8 is a frontal view of the apparatus of FIG. 7 taken along line 8—8 thereof.

In the foregoing brief description the "side" view in FIG. 7 is designated as such in the sense that it represents a view perpendicular to the direction of travel of the objects on the conveyor, and the "frontal" view of FIG. 8 is so designated in the sense that it represents a view looking in the same direction as the direction of travel of the conveyed objects. Since the apparatus can be turned in any suitable direction relative to the conveyor, the terms "side" and "frontal" are not used and are not to be construed in a restrictive or limitive sense. Rather, they are to be considered merely as terms of convenience for description purposes.

Detailed Description

A feature of this invention is that unlike the culinary items described in U.S. Pat. No. 3,508,183 wherein a preselected quantity of magnetically attractive particles is discriminantly positioned within the article so that the magnetic particles are positioned throughout a major portion of the article, the culinary items or utensils of this invention have the magnetically responsive material confined to one specific location—vis., the end portion of the items. In this way the magnetic engagement which occurs when using these items with apparatus of this invention occurs selectively at the end portion. Thus, once the items have been magnetically engaged and lifted from a conveyor or carrying tray or other appropriate source, the items can be transported along a predetermined path in a predetermined position. Further, in accordance with this invention the relative configuration or size of the end portion is itself utilized to classify or sort the respective culinary articles by type. And once disengagement has been effected, isolation of the classified articles each from the other has been accomplished. As will become still further apparent as this description proceeds, all of these operations can readily be effected automatically by simple, durable and relatively economical apparatus. Thus, the culinary items and apparatus of this invention can be used in combination to considerable advantage in restaurants, cafeterias, hospitals, hotels, convention centers, correctional institutions, schools and in general, in all types of establishments or institutions, whether public or private, where food or refreshments are served.

Accordingly, another embodiment of this invention involves the combination of culinary items having magnetically responsive end portions as above described, means for magnetically carrying the items by said end portions and means for classifying the items according to the size of the end portion and isolating the classified articles each from the other. Still another similar embodiment of this invention pertains to the combination of (i) an article of table silverware having at the end of the handle thereof a generally spherically shaped magnetically responsive end portion, the balance of the article being essentially nonmagnetically responsive, (ii) magnetic means for magnetically engaging and carrying said article by means of the generally spherically shaped magnetically responsive end portion of said article, said magnetic means having a smaller cross-sectional size than the cross-sectional size of said end portion, and (iii) means for establishing contact with the end portion of the carried article to disengage the article from said magnetic means.

Turning now more particularly to the embodiments depicted in the Drawings, FIGS. 1, 1A, 2, 2A, 3, 3A, 4 and 4A depict culinary articles of this invention wherein the spherical end portions 10, 12, 15, 17 are formed from iron or other suitable magnetic metals or alloys either in integral form (e.g., coated or uncoated solid or hollow spheres) or in finely divided form as a filler in an appropriate plastic or ceramic matrix. In the case of the silverware, the balance of the article is preferably fabricated from stainless steel or plastic material, although other non-magnetic metals or alloys are available and suitable for use. The dishes can of course also be fabricated from non-magnetically responsive metals or metallic alloys to which the magnetically responsive end portion is attached, but as a general rule dishware composed mainly of plastics or ceramics is preferable to most consumers or users. An important feature of all such articles is that the magnetically responsive end portions 10, 12, 15, 17 differ in cross-sectional size according to the article, like articles having end portions of like cross-sectional size. For example, the forks will all have spherical cross sections of one given dimension (Dimension A in FIG. 1), the spoons will all have spherical cross sections of another given dimension (Dimension B of FIG. 2), the knives will all have spherical cross sections of still another dimension (Dimension C of FIG. 3), and the dishware used will have still other cross-sectional dimensions in their respective end portions (illustrated by Dimension D of FIG. 4). In these FIGS. the plates are shown as having spherical end portions 17 of the largest cross-sectional size and the forks are shown as having spherical end portions 10 of the smallest cross-sectional size, the spoons having spherical end portions 12 of somewhat larger size than 10 and the knives having end portions 15 somewhat larger than 12 but smaller than 17—i.e., Dimension D is greater than Dimension C, Dimension C is greater than Dimension B and Dimension B is greater than Dimension A. It will of course be readily apparent that any given type of article (knife, fork, spoon, plate, salad plate, cup, saucer, etc.) may be assigned any given cross-sectional dimension for its end portion—the allocation of dimensions to the articles is largely discretionary although as a general rule it is preferable to assign the largest end portions to the dishware items. The important feature is that whether of largest or smallest or of an intermediate size, all of one given type of article has a given cross-sectional size for its spherically shaped end portions and that particular size differs from the size assigned to another given type of article from which it is desired to effect an automatic separation. It will also be appreciated that there may be as many different cross-sectional sizes employed as there are differing articles of silverware and/or dishware to be retrieved and sorted. For example, if the articles to be retrieved and sorted only involve forks and spoons, two different cross-sectional dimensions for the respective spherically shaped end portions will suffice. On the other hand, six different cross-sectional dimension would be involved when employing for automatic retrieval and sorting silverware made up of regular forks, salad forks, teaspoons, soup spoons, table spoons and knives. By the same token, three different cross-sectional dimensions would be used when utilizing only cups, saucers and teaspoons as the items for retrieval and sorting on an automatic basic.

Figure 1:
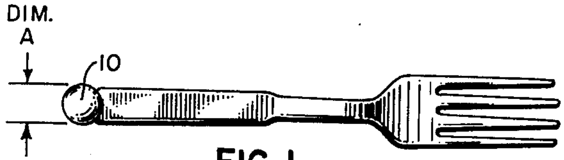
FIGS. 1 and 1A, 2 and 2A, and 3 and 3A depict magnetically responsive silverware of this invention suitable for use with the apparatus of FIGS. 7 and 8, FIGS. 1, 2 and 3 being plan views and FIGS. 1A, 2A and 3A being side views of the silverware.
Figure 1A:
Figure 2:
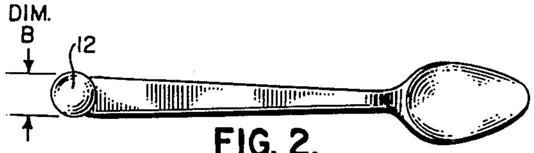
Figure 2A:
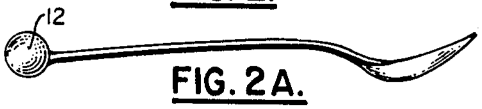
Figure 3:
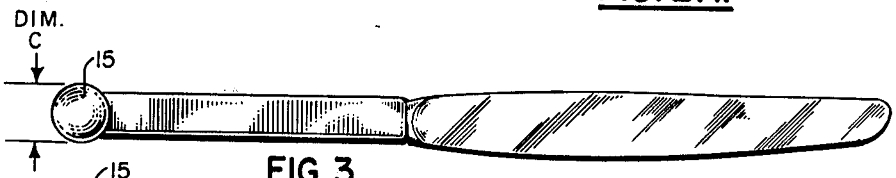
Figure 3A:
Figure 6:
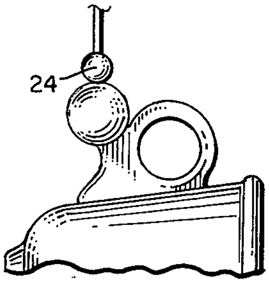
FIG. 6 is a fragmentary view showing a cup suspended from a magnetic finger of said apparatus.
Figure 4A:
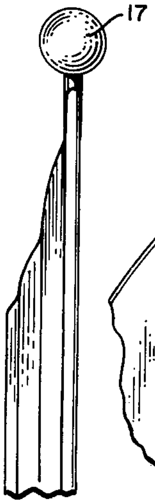
FIGS. 4 and 4A are fragmentary views illustrating magnetically responsive dishware of this invention, FIG. 4 being a partial plan view of a plate with a magnetically responsive end portion and FIG. 4A being a side view thereof.
Figure 4:
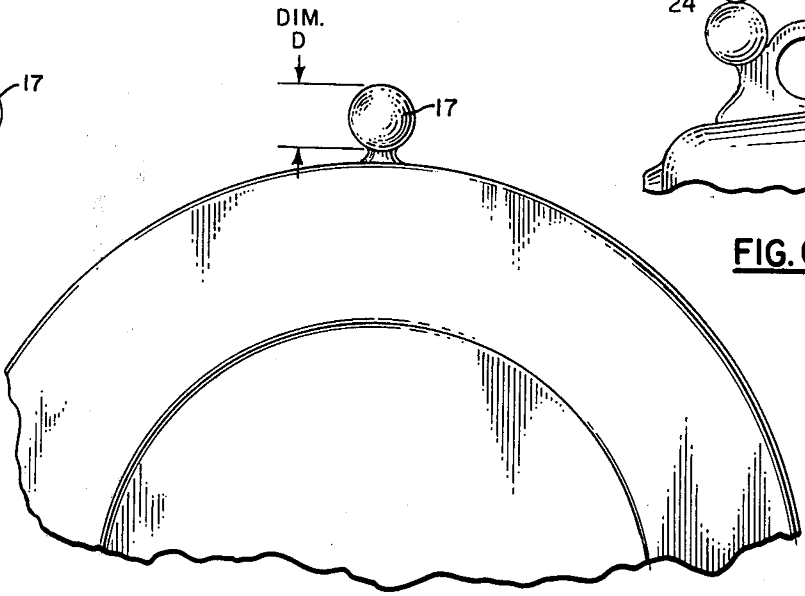

The culinary articles of this invention should have only one magnetically responsive end portion per article and in the case of dishware or chinaware the end portion should extend outwardly from the article to provide a point of balance from which the article may be suspended. For example, in the case of cups of the type normally used for tea or coffee (i.e., cups with a handle thereon) it is desirable to have the looped handle slope upwardly and outwardly from the body so that the highest portion of the looped handle is near the plane of the rim of the cup, and to have a magnetically responsive end portion affixed to, imbedded in or integrally formed with the handle so that the end portion represents an upward and outward linear extension of the looped handle. By suitably shaping and controlling the weight distribution in the cup, this arrangement enables the entire cup (including its handle) to be suspended below the spherical or other appropriately-shaped magnetically responsive end portion. Another desirable arrangement for cups is illustrated in FIG. 6. In this instance the magnetically responsive end portion protrudes or extends outwardly and downwardly from the handle enabling the cup to be suspended from a magnet 24 as shown. In the case of relatively flat dishes such as platters, saucers, dinner plates, etc., and bowl-shaped dishes such as soup bowls, dessert dishes, etc., the end portion is preferably affixed to the rim so that the end portion projects outwardly from the article. Note FIG. 4 and 4A. To achieve symmetry for aesthetic purposes it is possible to equally space around the rim a number of end portions of the same shape and size and appearance, only one of which is magnetically responsive, the balance being non-responsive to a magnet.

Figure 5:
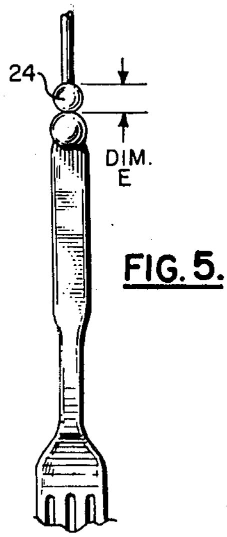
FIG. 5 is an enlarged view of magnetic engagement between a magnetically responsive article of silverware (viz., a fork of FIGS. 1 and 1A) and a suspended magnetic lifter or finger of the apparatus of FIGS. 7 and 8.

Referring now to FIGS. 7 and 8 depicting apparatus for retrieving and classifying such culinary items, the apparatus is shown and will be described in connection with silverware retrieval and classification although the basic principles involved can be applied to retrieving and sorting dishware articles or combinations of dishware articles and silverware articles. In the form depicted the apparatus comprises a rotating assembly made up of wheel 21 supporting at its periphery a plurality of spaced apart horizontal shafts 22, each of which in turn rotatably supports a plurality of fingers 23 depending downwardly therefrom. The apparatus as depicted in FIGS. 7 and 8 has four shafts 22 spaced at 90° intervals on wheel 21 and each such shaft carries ten fingers 23 so that the device illustrated has a total of forty fingers. There can of course be any suitable number of such shafts and such fingers in the apparatus. The extremity of each finger 23 has a spherical magnet 24 for effecting magnetic engagement with a spherical end portion of an article of silverware carried on a conveyor or the like. As shown by FIG. 5 (and also by FIG. 6) the cross-sectional size of the magnets 24 (Dimension E) is preferably smaller than the cross-sectional size of the smallest spherical end portion of the silverware (or dishware) employed (e.g., Dimension A of FIG. 1). Wheel 21 is rotatably supported on stationary axle 25 by hub 26 and bearing 27, the fastening being effected by means of threaded stud 28 and nut 29. The opposite end of stud 28 is welded or otherwise firmly attached to base plate 33 which in turn is suitably fastened to an appropriately braced or reinforced support. Washer 30 serves as a bearing surface between nut 29 and the interior of wheel 21. Rotation of wheel 21 is effected by means of belt 31 and pulley 32, the latter being fastened around hub 26 so that the hub and wheel 21 rotate as a unit on bearing 27 and its supporting axle 25 when belt 31 and pulley 32 are driven by a motor or other prime mover (not shown). To further reduce friction, bearing 37 is interposed between plate 33 and the outer end of hub 26. Preferably wheel 21 is rotated so that its lower portion travels toward the direction from which the culinary items come (note the arrows in FIG. 7). As shown by FIG. 8 the apparatus is preferably positioned so that shafts 22 extend across the conveyor although it is possible to design systems in which the shafts are parallel to the conveyor or are at some other suitable orientation relative thereto. In any such case the elevation of the apparatus is arranged such that at the lowermost portion of their travel in their respective circular paths of travel each row of fingers 23 is able to sweep over the surface of the conveyor and thereby enable the spherical magnets 24 to seek out the magnetically responsive spherical end portions of the silverware (or dishware) articles resting thereon. It will be seen therefore that rotation of wheel 21 causes the fingers to sweep over the conveyor and as a result magnetic attachments are effected between spherical magnets 24 and the spherical end portions of the silverware or the like such as is depicted in FIGS. 5, 6, 7, and 8. Continued rotation of the wheel results in the magnetically attached items being lifted and carried upwardly over the conveyor in arcuate paths and, when the apparatus is oriented relative to the conveyor as shown in FIGS. 7 and 8, in vertical planes parallel to the major axis of the conveyor. There are ten such planes for the apparatus depicted since ten fingers 23 are shown on each shaft 22.

At a suitable elevation along these arcuate paths of travel there is supported a disengager 34 composed of a plurality of upstanding dividers or walls 35 defining channels through which magnets 24 may pass. Hence, for the apparatus depicted there are ten such channels. The walls 35 are sloped toward each other in a vertical direction so that the top of each such channel is wide enough throughout its entire length to permit passage of finger 23 and the bottom of each such channel is wider than the larger or largest cross-sectional size (diameter) of the spherical end portions of the silverware or the like employed in the operation. In addition, the walls 35 converge toward each other either continuously or in incremental stages along the path of travel whereby the width of the channels progressively narrows continuously or in incremental steps or stages so that although magnet 24 can pass along an arcuate path throughout the entire channel, the spherical end portions of the magnetically engaged articles cannot pass through the full length of the channels. Thus, at the entrance to the channel the walls are sufficiently far apart so that irrespective of size any spherical end portion of an article suspended as in FIG. 5 can enter into the channel belonging to the particular finger and magnet by which the article is carried. However, at a suitable location along the path of travel the walls 35 close toward each other above and at the sides of the arcuate path through which magnets 24 pass so that the channel is constricted and tapered to a sufficient extent that no spherical end portion of any magnetically carried article may pass any further, either forwardly or upwardly. Since the magnets 24 are being pulled through their respective channels by fingers 23, shafts 22 and wheel 21 rotating as a unit, the magnets are pulled away from the articles which are then free to drop into a chute. In short, walls 35 converge along the predetermined path of travel of the spherically-shaped end portions of the silverware until a location is reached at which the end portion can proceed no further (except downwardly). At this location the magnet 24 and the silverware article are disengaged and the article drops from the channel.

It will be noted that since the cross-sectional sizes of the end portions of the different articles differ from type to type there are a plurality of locations along the arcuate path of travel through the channels at which disengagement occurs, the location of the disengagement being governed by the cross-sectional size (diameter) of the end portion of the article being carried. In other words, the articles with the larger or largest spherically shaped end portions are disengaged at a location closer to the entrance than the location at which the articles with the smaller or next smaller spherically shaped end portions are disengaged, and so on. Since, in the system depicted, three types of silverware articles are employed (each type having spherically shaped end portions differing in cross section or diameter from the other two types) there are three different locations along the path of travel through the channels defined by walls 35 where disengagement occurs. The silverware articles with the largest spherical end portions (in this case, the knives) are disengaged at a location nearest to the entrance to the channels above chute 121 and thus drop into chute 121. The articles with the next smaller spherical end portions (here, the spoons) are disengaged further along the path of travel in the channels; namely, above chute 123 into which they drop. The articles having the smallest spherical end portions (in this instance, the forks) are disengaged near the end of the path of travel in the channels above chute 125 and fall therein. Thus by the simple expedient of employing and properly positioning a plurality of adjacent, partitioned chutes 121, 123, 125, the apparatus automatically and continuously retrieves, classifies and separates the silverware. And by eliminating or removing the partitions between the chutes so that there is one large chute, the device can be employed for the purpose of retrieving the articles and transferring them to another desired location, again on a continuous, automatic basis. Application Ser. No. 410,482 filed concurrently herewith, describes automatic scullery systems wherein in some situations the apparatus is employed for retrieval and transfer purposes and other situations where it is employed for retrieval, classification and separation purposes.

A variation in the design of disengager 34 which is best used only when handling silverware involves shaping and positioning walls 35 so that magnets 24 actually emerge from the top of their respective channels at an appropriate location along their respective paths of travel. The channels are progressively narrowed by the opposed walls 35 as the location of magnet emergence is approached so that no spherical end portion of the silverware can reach the location of magnet emergence. As before, the result is that each item of silverware is "pinched off" by the walls and falls from the channel into one or more chutes such as 121, 123, 125.

As noted above, the principles involved in the apparatus depicted in and discussed with reference to FIGS. 7 and 8 can be applied to retrieval and transfer or to retrieval, classification and isolation of dishware or combinations of dishware and silverware. In designing the apparatus for such usage it is desirable to utilize a relatively large wheel 21 or an equivalent thereof so that the predetermined paths of travel of the fingers and magnets 23, 24 are long whereby a relatively long disengager 34 and one or more relatively wide chutes can be furnished to accommodate the size of the dishware articles. By the same token it is desirable to avoid impact or jarring contact between the suspended dishware articles and the walls of disengager 34 to prevent the articles from being accidentally disengaged at an undesired location. Accordingly, in systems where the apparatus is to handle dishware items, walls 35 should have suitably reduced height or should be replaced by downwardly flared rails which progessively converge toward each other adjacent the arcuate path taken in disengager 34 by the spherical end portions of the articles magnetically engaged to magnets 24 so that disengagement occurs at the proper location. It will of course be appreciated that guide rails may be furnished to cause the suspended dishware items (especially plates) to be aligned generally parallel to the path of travel so that they do not interfere with the travel of articles in adjacent paths. For best results such guide rails should be on only one side of any given path of travel so that they cause the mis-aligned articles to rotate on magnet 24 into proper alignment. Of course once the articles are in proper alignment they may proceed between guide rails on both sides of the path of travel.

To best deal with the size and shape of dishware, it is preferable when retrieving and/or sorting dishware (with or without silverware) to employ in series a plurality of devices of the type depicted in FIGS. 7 and 8 (with larger wheels 21, longer disengagers 34 and larger chutes, all as noted above). The use of such devices in series enables the fingers to be more widely spaced on shafts 22 to reduce or eliminate the likeihood of interference between adjacent suspended articles. And by using a plurality of such devices the successive units may be arranged so that their magnetic fingers sweep along paths on the conveyor that are offset from the paths swept by the fingers of one or more preceding units with the result that an item which passes through one or more units because of the relatively wide spacing between the magnetic fingers across the conveyor will be intercepted by one of the magnetic fingers of a subsequent device whose fingers travel in planes laterally offset from the planes in which the fingers of the preceding unit(s) travel. In order to illustrate such an arrangement the reader should visualize, for example, five units of the type shown in FIGS. 7 and 8 (but large enough to furnish chutes to accommodate, inter alia, dinner plates) aligned along the conveyor belt so that the wheels 21 of the units all lie within the same plane parallel with the major axis of the belt. In other words, there would be four more units in a row directly behind an enlarged unit of the type shown in FIG. 8. In this illustrative example each of the five units would have four shafts 22 but instead of having ten channels served by ten magnetic fingers 23, 24 per shaft, each shaft of each unit would have only two magnetic fingers 23, 24 and there would be only two channels per unit. Referring again to FIG. 8, for the purposes of this illustration the channels depicted therein shall be consecutively numbered from left to right as 1 to 10 inclusive and all of the fingers 23 with their associated magnets 24 shall be numbered from left to right as 1 to 10 inclusive. Now, in this illustration the first unit will have magnetic fingers numbers 1 and 6 on all four shafts and the unit will have only two channels; namely, numbers 1 and 6—all of the unnecessary walls (i.e., walls which do not define channel number 1 or 6) and all of the other fingers and magnets would be absent from the first unit. The second unit in the series would be just like the first unit except the second would have magnetic fingers numbers 2 and 7 on its four shafts and the unit would have channels 2 and 7—again all of the other fingers and magnets as well as the unnecessary walls would be absent. The third unit in the series would be just like its two predecessors except it would have magnetic fingers numbers 3 and 8 as well as channels 3 and 8 and no other fingers or magnets and no other walls except those defining channels 3 and 8. The next unit would be just like the first three just described except in this case it would have magnetic fingers numbers 4 and 9 and channels 4 and 9—all other magnetic fingers and all unnecessary walls would be absent. And the final unit of this series would have only channels numbers 5 and 10 and only magnetic fingers numbers 5 and 10—it would have no other fingers and magnets nor any unnecessary walls. It will be seen that these five serially-arranged units have a grand total of 40 magnetic fingers collectively covering the conveyor to the same extent as the single unit depicted in FIGS. 7 and 8. For example, the knife shown being lifted by the lowermost magnetic finger number 3 in FIG. 8 would be captured by the third unit of the series even though it may have eluded capture by the first two units. Moreover, by providing wide lateral separation between the two paths of travel of the magnetic fingers in each individual unit, a dinner plate picked up, say, by a number 1 finger of the first unit should not interfere in any way with another dinner plate even if it is picked up simultaneously by the laterally-positioned number 6 finger on the same shaft of the same unit. It will also be apparent that the chutes from the five units in this illustrative example can be arranged so that the five respective chutes which receive one type of article (dinner plates, for example) can be merged together or lead to a common chute, conveyor or other artery whereby the dinner plates may be kept isolated from the other classified articles, that the five respective chutes which receive another type of article (cups, for example) can likewise be merged or fed to a common artery in order to keep the cups separated by type, and so on.

As the Drawings indicate, the preferred configurations for the magnetic extremities of the fingers 23 are spherically-shaped magnets 24 whose size (diameter) is preferably smaller than the smallest diameter of the magnetically responsive end portions of the culinary items being used therewith. Nevertheless, magnets of other configurations can be utilized, such as rods, truncated cones, etc. Similarly, the magnetically responsive end portions of the culinary items can be of various configurations although in general it is preferable to employ end portions which terminate in a rounded or dome-shaped surface such as a hemisphere. It is possible to use items whose magnetically responsive end portions are in cross section elliptical, square-shaped with rounded corners defining four arcs of a circle, or of other configurations so long as the size and shape of the end portion can be accommodated and utilized in the disengaging means for effecting disengagement at a preselected location. For example, end portions having elliptical cross sections are feasible for effecting classification when the major and minor axes of the elliptical cross sections of one type of article are both smaller than the minor axis of the elliptical cross sections of another type of article—irrespective of the orientation of these end portions in the channels, disengagement is effected in one of two zones, one zone defined by the minimum and maximum thicknesses of the elliptically cross-sectioned end portions of one of the types of articles and the other zone by the minimum and maximum thicknesses of the elliptically cross-sectioned end portions of the other type of article. However, from the standpoint of simplicity of design and operation, end portions of circular cross sections are preferred, culinary items magnetically responsive end portions are generally spherical or spheroidal being most preferred.

It will be noted that by employing magnets and end portions that are spherically shaped, point-to-point contact occurs there-between during magnetic engagement and this enables relative movement between the two spherical surfaces while they are magnetically engaged with each other so that the culinary item can assume a balanced suspended position without prematurely separating from the magnet. Also point-to-point contact between magnet and end portion facilitates rotation of the suspended culinary item about its axis by a guide rail or the like where it is desired to orient the item as it travels along its predetermined path toward and into the disengaging means.

Although it is possible by appropriately contouring walls 35 to use magnets whose cross-sectional size is equal to or even slightly larger than the cross-section of sizes of the smallest end portion employed on the culinary items, it is preferable to utilize systems in which the cross-sectional size of the extremities of the magnetic fingers is smaller than the cross-sectional size of the smaller or smallest end portions of the culinary items being employed. This greatly reduces if not eliminates the possibility of a given magnet picking up and carrying more than one item at a time.

Although apparatus has been discussed and depicted in which the repetitive cyclical paths through which the magnetic fingers travel are circular, it is possible to move them in elliptical paths, paths having horizontal segments of travel and the like. This may be accomplished for example by affixing a plurality of linearly spaced shafts 22 at right angles to (and between) a pair of laterally spaced belts of link travelling on suitably positioned cog wheels or pulleys so that the belts travel in identical paths at identical speeds in laterally spaced parallel vertical planes.

It will be appreciated from the foregoing description that in essence the fingers 23 are suspended from a plurality of parallel spindles (shafts 22) so that each finger is free to rotate about at least a portion of the spindle from which it is suspended. Some lateral motion of the extremities of the suspended magnetic fingers is permissible provided of course that adjacent magnets 24 do not interfere with each other.

As many possible embodiments may be made of the invention without departing from the scope thereof, it is to be understood that all matter herein set forth or shown in the accompanying drawings is to be interpreted as illustrative and not in a limiting sense.

I claim:

1. A plurality of different types of culinary articles in which each type of article has a magnetically responsive protuberance of essentially circular cross section extending from an end thereof, said protuberances differing in cross-sectional sizes according to the type of article, similar type articles having protuberances of the same cross-sectional size, and the balance of each of the articles, other than the protuberance, being essentially non-magnetically responsive.

2. Articles according to claim 1 wherein the outer end of each said protuberance terminates in a hemisphere.

3. Articles according to claim 1 wherein said protuberances are generally spherical in shape.

4. Articles according to claim 1 wherein said articles include plates, each said plate having its said protuberance extending outwardly from the rim thereof.

5. Articles according to claim 1 wherein said articles include cups each with a handle thereon, each said cup having its said protuberance extending outwardly from the handle thereof.

6. Articles according to claim 1 wherein said articles include a. plates in which each said plate has its said protuberance extending outwardly from the rim thereof;

b. cups each with a handle thereon and in which each said cup has its said protuberance extending outwardly from the handle thereof; and c. table silverware in which each article of table silverware has its said protuberance extending outwardly from the outer end of the handle thereof.

7. A plurality of different types of table silverware in which each type of article has a magnetically responsive protuberance extending outwardly from the outer end of the handle thereof, the balance of each of the articles other than the protuberance being essentially non-magnetically responsive, said protuberances differing in cross-sectional sizes according to the article, similar type articles having protuberances of the same cross-sectional size, said protuberances being further characterized (i) by being of generally symmetrical cross section, (ii) by having curved or rounded surfaces, and (iii) by being dome-shaped at their outer ends.

8. Articles according to claim 7 wherein said protuberances are generally spherical in shape.

9. Articles according to claim 7 composed predominantly of stainless steel.

10. Articles according to claim 7 composed predominantly of plastic material.

* * * * *